United States Patent
Yuasa

(10) Patent No.: US 9,942,649 B2
(45) Date of Patent: Apr. 10, 2018

(54) OSCILLATION PREVENTING MEMBER FOR STYLUS-TIP PROTECTOR AND PICKUP CARTRIDGE

(71) Applicant: AUDIO-TECHNICA CORPORATION, Machida-shi, Tokyo (JP)

(72) Inventor: Hiroyuki Yuasa, Machida (JP)

(73) Assignee: AUDIO-TECHNICA CORPORATION, Machida-Shi, Tokyo (JP)

( * ) Notice: Subject to any disclaimer, the term of this patent is extended or adjusted under 35 U.S.C. 154(b) by 0 days.

(21) Appl. No.: 15/685,696

(22) Filed: Aug. 24, 2017

(65) Prior Publication Data

US 2018/0063630 A1 Mar. 1, 2018

(30) Foreign Application Priority Data

Aug. 29, 2016 (JP) .................................. 2016-166704

(51) Int. Cl.
| | |
|---|---|
| *G11B 3/54* | (2006.01) |
| *H04R 1/18* | (2006.01) |
| *G11B 3/46* | (2006.01) |
| *H04R 11/12* | (2006.01) |

(52) U.S. Cl.
CPC .................. *H04R 1/18* (2013.01); *G11B 3/46* (2013.01); *H04R 11/12* (2013.01)

(58) Field of Classification Search
None
See application file for complete search history.

(56) References Cited

U.S. PATENT DOCUMENTS

| 2,262,503 | A | * | 11/1941 | Kierulff | ............... | G11B 3/5836 |
| | | | | | | 369/244.1 |
| 2,327,094 | A | * | 8/1943 | Catucci | .................... | G11B 3/52 |
| | | | | | | 369/173 |
| 3,104,109 | A | * | 9/1963 | Bodkin | ................. | G11B 33/04 |
| | | | | | | 369/291.1 |
| 4,165,078 | A | * | 8/1979 | Kuehn | ..................... | G11B 3/54 |
| | | | | | | 369/170 |
| 4,198,056 | A | * | 4/1980 | Cooper | ................ | G11B 3/5845 |
| | | | | | | 369/170 |

(Continued)

FOREIGN PATENT DOCUMENTS

| JP | S49-27206 Y1 | 7/1974 |
| JP | S59-003400 Y2 | 1/1984 |

*Primary Examiner* — William J Klimowicz
(74) *Attorney, Agent, or Firm* — Manabu Kanesaka

(57) ABSTRACT

An oscillation-preventing member for a stylus-tip protector is provided with a base member and a pair of leg parts integrally formed by employing a flexible sheet material. The pair of leg parts is bent at the same angle and in the same direction with respect to the base member. This oscillation-preventing member is mounted on a cartridge body, sandwiching a cartridge case from both outer sides with the pair of leg parts to prevent oscillation of a stylus-tip protector by bringing the base member into contact with part of the stylus-tip protector. This structure allows to provide an oscillation-preventing member for a stylus-tip protector, being attached/detached easily, manufactured at low costs, and configured to reliably prevent oscillation of a stylus-tip protector according to an impact.

5 Claims, 2 Drawing Sheets

(56) References Cited

U.S. PATENT DOCUMENTS

| | | | | |
|---|---|---|---|---|
| 4,270,758 A | * | 6/1981 | Kehl | G11B 3/092 |
| | | | | 369/170 |
| 4,271,335 A | * | 6/1981 | Okura | H04R 11/12 |
| | | | | 369/136 |
| 4,342,394 A | * | 8/1982 | Taylor | G11B 3/46 |
| | | | | 206/521 |
| 4,404,670 A | * | 9/1983 | Taylor | H04R 1/16 |
| | | | | 369/126 |
| 4,513,410 A | * | 4/1985 | Fairbanks | G11L 321/16 |
| | | | | 369/126 |
| 4,802,081 A | * | 1/1989 | Otzipka | H04R 11/12 |
| | | | | 369/136 |

\* cited by examiner

OSCILLATION PREVENTING MEMBER FOR STYLUS-TIP PROTECTOR AND PICKUP CARTRIDGE

RELATED APPLICATIONS

The present application is based on, and claims priority from, Japanese Application No. JP2016-166704 filed Aug. 29, 2016, the disclosure of which is hereby incorporated by reference herein in its entirety.

BACKGROUND OF THE INVENTION

Field of the Invention

The present invention relates to an oscillation-preventing member for a stylus-tip protector to be mounted on a pickup cartridge including a stylus-tip protector configured to protect a reproducing stylus that traces sound grooves of a record disk. This oscillation-preventing member for a stylus-tip protector is configured to prevent oscillation of the stylus-tip protector caused by an impact during conveyance and the like. The present invention further relates to a pickup cartridge equipped with this oscillation-preventing member for a stylus-tip protector.

Description of the Related Art

Among the pickup cartridges including the reproducing stylus (hereinafter referred to as stylus) for tracing sound grooves of a record disk, a pickup cartridge with a cover member, stylus-tip protector, for protecting the stylus has been proposed in order to prevent damages on the stylus when the pickup cartridge is unused (stored) or conveyed.

A pickup cartridge fitted with such a stylus-tip protector is disclosed, for example, in JP-UM-B-S49-27206 (Patent Literature 1), JP-UM-B-S59-3400 (Patent Literature 2), and the like.

FIG. 4 illustrates an appearance of a pickup cartridge 11 including a structure similar to that of the pickup cartridge including the stylus-tip protector disclosed in Patent Literatures 1 and 2.

This pickup cartridge 11 represents, for example, a moving magnet (MM) cartridge. Namely, in this MM cartridge 11, a stylus-replacement unit 13 is detachably mounted on a cartridge body 12 provided with a built-in magnetic circuit such as a coil and a yoke. This stylus-replacement unit 13 is provided with a cantilever at leading end of which a stylus is attached and at a base end of which a magnet is attached via a damper.

In an example illustrated in FIG. 4, a stylus-tip protector 13b is disposed in a front end of a knob member 13a also performing as a unit case of the stylus-replacement unit 13. This stylus-tip protector 13b has a U-shape, including leg parts both of which are rotatably attached to the knob member 13a. The stylus-tip protector 13b can be rotated within a range indicated by a double-headed void arrow.

By standing the stylus-tip protector 13b as illustrated in FIG. 4, it is possible to cover the stylus and cantilever supporting the stylus and to protect an oscillatory system including the stylus and cantilever by this stylus-tip protector 13b.

By pressing down the stylus-tip protector 13b in front of the knob member 13a, the stylus and cantilever are exposed and can be used as a pickup cartridge. In other words, the stylus-tip protector 13b can be clicked with the knob member 13a so that a position of the stylus-tip protector 13b is set to either of the states indicated by the two-headed arrow illustrated in FIG. 4.

Note that FIG. 4 illustrates a state where the stylus-tip protector 13b is standing up so that the stylus and cantilever are hidden behind the stylus-tip protector 13b and cannot be seen.

SUMMARY OF THE INVENTION

In shipment, attention is given to the pickup cartridge illustrated in FIG. 4 by containing the product in a protective case so as to protect the entire cartridge including the oscillatory system such as the stylus and cantilever.

However, in a case where the cartridge is subjected to, for example, a strong impact due to dropping during conveyance, the product may be delivered to a user in such a state that the stylus-tip protector is rotated and the stylus and cantilever are exposed.

This type of pickup cartridge is not only a product heavily counting on users' preferences or palates but also a delicate precision component. Therefore, when a user opens the protective case and finds that the stylus-tip protector is opened and the stylus and cantilever are exposed, such a situation will give the user a bad impression and unpleasant feeling such as a sense of distrust with respect to the manufacturer.

This situation may diminish the value and image of the product even though there is no damage on the pickup cartridge itself.

In shipment of the product, it is conceivable to fix the stylus-tip protector with an adhesion tape, but fixing with the adhesion tape does not always make a good showing. Furthermore, when peeling off the adhesion tape, the stylus-tip protector may also be removed by mistake. Still further, after peeling off the adhesion tape, adhesive glue may remain, which causes disfigurement of the cartridge.

An object of the present invention is to provide an oscillation preventing member for a stylus-tip protector easily mountable on and detachable from a pickup cartridge including a stylus-tip protector, manufactured at low costs, and configured to reliably prevent oscillation of the stylus-tip protector caused by an impact during conveyance and the like; and to provide a pickup cartridge.

In regard to an oscillation preventing member for a stylus-tip protector according to an embodiment of the present invention which has been provided to solve the problems mentioned above, the oscillation preventing member for a stylus-tip protector is provided with a base member and a pair of leg parts formed in an integrated manner by employing a flexible sheet material, the pair of leg parts having a width in the same direction and being bent at the same angle in the same direction with respect to the base member, wherein the oscillation preventing member is mounted on a pickup cartridge, sandwiching the pickup cartridge from both outer sides by the pair of leg parts, and wherein the oscillation preventing member is configured to prevent oscillation of a stylus-tip protector by bringing the base member into contact with part of the stylus-tip protector covering a stylus.

In this case, in a preferable embodiment, at least one of the pair of leg parts is formed with a locking part disposed in a leading end of one of the pair of leg parts, facing the other leg part, wherein the locking part is locked in a surface perpendicular to the both outer sides of the pickup cartridge so that the oscillation preventing member is kept mounting on the pickup cartridge.

Furthermore, the base member is preferably provided with a protrusion formed along a surface of the base member, disposed between the pair of leg parts, wherein the protrusion is brought into contact with part of a cartridge body to keep the pair of leg parts and the base member bending.

Still further, slits are preferably formed in the base member so as to extend both longitudinal sides of the protrusion formed along the surface of the base member.

In addition, in regard to a pickup cartridge according to an embodiment of the present invention, the pickup cartridge is equipped with the oscillation preventing member for a stylus-tip protector mentioned above.

The oscillation-preventing member for a stylus-tip protector having the structure mentioned above is attached to the pickup cartridge by using the pair of leg parts that is integrally formed with the base member. The base member bent at a predetermined angle with respect to the pair of leg parts is brought into contact with part of the stylus-tip protector covering the stylus so as to prevent the oscillation of the stylus-tip protector.

Namely, this oscillation-preventing member is attached to the cartridge body, sandwiching a cartridge case with the pair of leg parts from both outer sides, so that the oscillation preventing member can be easily attached to and detached from the pickup cartridge.

This oscillation-preventing member can be formed of a transparent resin material such as a flexible sheet material, for example, polyethylene terephthalate (PET). This configuration can provide an oscillation preventing member for a stylus-tip protector manufactured at low costs, excellent in appearance, and configured to reliably prevent oscillation of the stylus-tip protector when subjected to an impact by utilizing elastic characteristics of the material.

DESCRIPTION OF THE PREFERRED EMBODIMENTS

Figure 1:
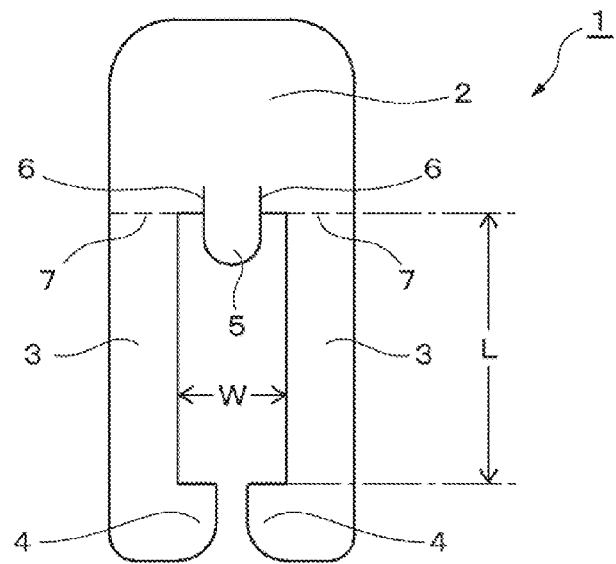
FIG. 1 is a plan view illustrating an oscillation-preventing member for a stylus-tip protector according to an embodiment of the present invention.

An oscillation-preventing member for a stylus-tip protector according to an embodiment of the present invention (hereinafter simply referred to as the oscillation-preventing member) can be made by punching with a punching die as illustrated in FIG. 1 as a unit, using a flexible sheet material, preferably a transparent resin material such as PET.

An oscillation preventing member 1 illustrated in FIG. 1 is provided with a pair of leg parts 3 parallel to each other in the same direction, integrally formed with a base member 2 formed into a quadrilateral shape with each corner cut out in an arc shape. Each of the pair of leg parts 3 is formed linearly and has a leading end formed in such a manner that a locking part 4 with a semicircular shape is formed, protruding inward and opposing each other.

In the base member 2, a protrusion 5 is formed along a surface of the base member 2 and between the pair of leg parts 3. Furthermore, in the base member 2, both sides in a longitudinal direction of the protrusion 5 have a cut to form slits 6.

Figure 2:
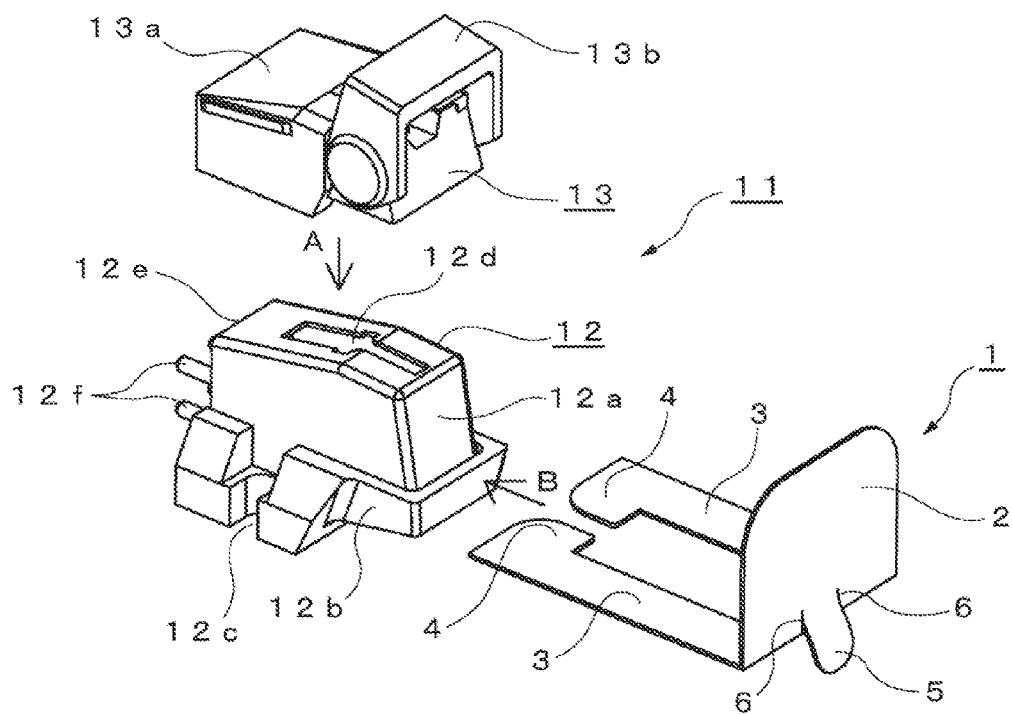
FIG. 2 is a perspective view illustrating an aspect in which a pickup cartridge is to be equipped with the oscillation-preventing member illustrated in FIG. 1.
Figure 3:
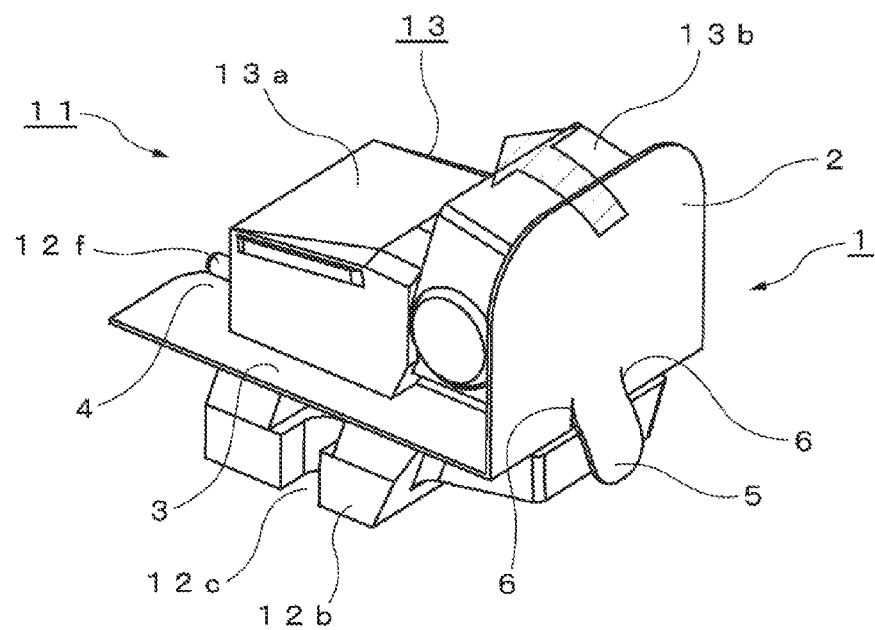
FIG. 3 is a perspective view illustrating an aspect in which the pickup cartridge is equipped with the oscillation preventing member.

In addition, a bent part 7 (a part to make a valley fold of approximately 90 degrees), indicated by a broken line in FIG. 1, is formed linearly between the base member 2 and the pair of leg parts 3. Due to this bent part 7, the pair of leg parts 3 is bent at the same angle and in the same direction with respect to the base member 2. FIGS. 2 and 3 illustrate an aspect in which the bent part 7 is bent.

Figure 4:
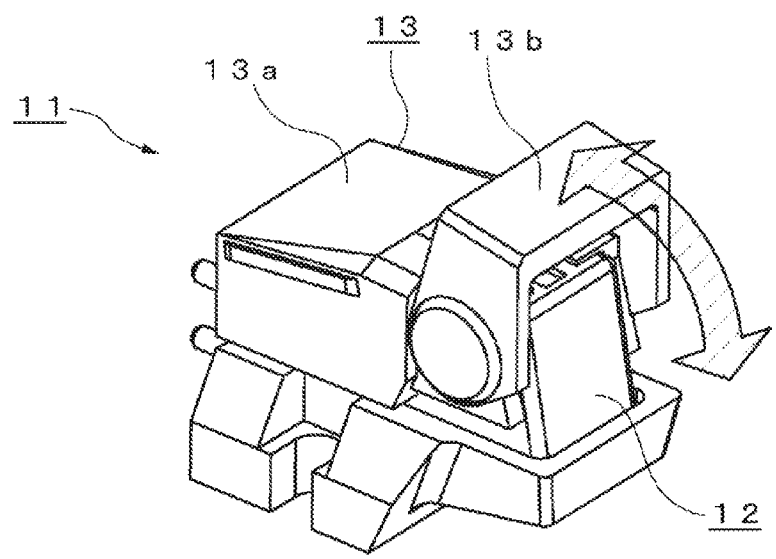
FIG. 4 is a perspective view illustrating an external structure of the pickup cartridge.

A pickup cartridge 11 illustrated in FIGS. 2 and 3 is similar in structure to one described with reference to FIG. 4. The pickup cartridge 11 includes a cartridge body 12; and a stylus-replacement unit 13 detachably attached to the cartridge body 12.

In the cartridge body 12, a cartridge case 12a having a substantially cuboid shape, provided with a built-in magnetic circuit such as a coil and a yoke is mounted on a base 12b. The base 12b is slightly larger than the cartridge case 12a in width and length. Each side of the base 12b in the longitudinal direction is provided with a groove hole 12c through which a screw is inserted to fasten the pickup cartridge 11 to a head shell which is no shown.

In the cartridge case 12a, a surface to which the stylus-replacement unit 13 is to be mounted is provided with an opening 12d formed along the longitudinal direction of the surface. When the stylus-replacement unit 13 is mounted, this opening 12d accommodates a part of a cantilever, magnet, and damper.

Terminal pins 12f as output terminals of the cartridge are disposed on a surface 12e at the tail end of the cartridge case 12a.

Although it is not illustrated, as described above, a stylus is attached to the distal end of the stylus-replacement unit 13, and the cantilever provided with the magnet and the like at the proximal end is vibratably disposed with a damper on a side closer to the knob member 13a serving as a unit case.

Leg parts of a stylus-tip protector 13b having a U-shape are attached rotatably with respect to the knob member 13a in a front end of the knob member 13a. As illustrated in FIG. 2, the stylus-replacement unit 13 is mounted on the cartridge body 12 in a direction indicated by the arrow A, thereby constituting the pickup cartridge 11.

In this pickup cartridge 11, the oscillation-preventing member 1 for a stylus-tip protector is attached along a gap between the base 12b of the cartridge body 12 and the knob member 13a of the stylus-replacement unit 13.

A length L at the leg parts 3 of the oscillation-preventing member 1 between the base member 2 and the locking parts 4 is set to be slightly larger than a length of the cartridge case 12a along the base 12b of the cartridge body 12. Furthermore, a width W between the leg parts 3 of the oscillation-preventing member 1 is set to be slightly larger than a width of the cartridge case 12a along the base 12b.

Since the oscillation-preventing member 1 is formed of PET with a thickness of about 0.3 mm, the oscillation-preventing member 1 deforms with moderate elasticity. By mounting the oscillation-preventing member 1 on the pickup cartridge 11 in a direction indicated by the arrow B in FIG. 2, the oscillation-preventing member 1 can be easily mounted without much of resistance.

In such a case, the pair of leg parts 3 of the oscillation-preventing member 1 is mounted on the cartridge case 12a, sandwiching the same from both outer sides. Each locking part 4 formed inward at the leading end of each leg part 3 is locked in a surface perpendicular to the both outer sides of the cartridge case 12a, that is, the surface 12e in the tail end of the cartridge case 12a. Thus, the oscillation-preventing member 1 can be kept being mounted on the pickup cartridge 11.

In the oscillation preventing member 1 illustrated in the drawings, each locking part 4 is formed inwardly directed at the leading end of each leg part 3. However, note that it is possible to achieve a similar effect even in a case where one locking part 4 is provided to one leg part, facing the other leg part.

As illustrated in FIG. 3, in regard to the oscillation preventing member 1 attached to the pickup cartridge 11, the protrusion 5 formed along the surface of the base member 2 is brought into contact with part of the base 12b of the cartridge body 12. Accordingly, biasing force (bending behavior) in a direction indicated by a void arrow is applied to the base member 2 through the bent part 7, and the base member 2 is brought into contact with the stylus-tip protector 13b in an upright position.

The protrusion 5 formed in the base member 2 is moderately curved in an opposite direction to the cartridge body 12 due to the slits 6 cut in the base member 2 along the protrusion 5, so that spring force according to the curvature is applied to the protrusion 5.

Subjected to reaction of the spring force applied to the protrusion 5, the base member 2 is flexibly brought into contact with the stylus-tip protector 13b and prevents the oscillation of the stylus-tip protector 13b. Thus, the pickup cartridge 11 maintains its state as illustrated in FIG. 3 even when subjected to some impacts.

As is clear from the above description, the oscillation-preventing member for a stylus-tip protector according to an embodiment of the present invention can be easily attached to and detached from a pickup cartridge. By employing a transparent resin material such as PET, it is possible to achieve the effects mentioned above, that is, for example, capable of manufacturing an oscillation preventing member for a stylus-tip protector at low costs; forming an oscillation preventing member for a stylus-tip protector excellent in appearance; and reliably preventing oscillation of a stylus-tip protector when subjected to an impact by utilizing the elastic characteristics of the material. A pickup cartridge provided with a replaceable stylus has been described herein, but the present invention may be applicable to a cartridge with a non-replaceable stylus. Furthermore, the present invention is applicable to a moving coil (MC) cartridge as well as a MM cartridge.

What is claimed is:

1. An oscillation-preventing member for a stylus-tip protector, comprising:
    a base member; and
    a pair of leg parts integrally formed with the base member by employing a flexible sheet material, the pair of leg parts having a width in the same direction and being bent at the same angle in the same direction with respect to the base member,
        wherein the oscillation preventing member is mounted on a pickup cartridge, sandwiching the pickup cartridge from both outer sides by the pair of leg parts, and
        wherein the oscillation-preventing member is configured to prevent oscillation of a stylus-tip protector by bringing the base member into contact with part of the stylus-tip protector covering a reproducing stylus.

2. The oscillation preventing member for a stylus-tip protector according to claim 1,
    wherein at least one of the pair of leg parts is formed with a locking part disposed in a leading end of one of the pair of leg parts, facing the other leg part,
    wherein the locking part is locked in a surface perpendicular to the both outer sides of the pickup cartridge so that the oscillation preventing member is kept mounting on the pickup cartridge.

3. The oscillation preventing member for a stylus-tip protector according to claim 1,
    wherein the base member is provided with a protrusion formed along a surface of the base member, disposed between the pair of leg parts,
    wherein the protrusion is brought into contact with part of a cartridge case to keep the pair of leg parts and the base member bending.

4. The oscillation preventing member for a stylus-tip protector according to claim 3,
    wherein slits are formed by cutting the base member so as to extend along both longitudinal sides of the protrusion formed along the surface of the base member.

5. A pickup cartridge which is equipped with the oscillation-preventing member for a stylus-tip protector described in claim 1.

* * * * *